United States Patent [19]

Spicuzza, Jr. et al.

[11] 4,017,670
[45] Apr. 12, 1977

[54] SUSPENSION POLYMERIZATION PROCESS

[75] Inventors: John P. Spicuzza, Jr., Pittsburgh; Frank J. E. Mills, Beaver, both of Pa.

[73] Assignee: ARCO Polymers, Inc., Philadelphia, Pa.

[22] Filed: May 24, 1976

[21] Appl. No.: 689,025

[52] U.S. Cl. .............................. 526/233; 260/880 R; 526/346

[51] Int. Cl.² ................... C08F 12/04; C08F 12/08

[58] Field of Search ............................ 526/233, 346

[56] References Cited

UNITED STATES PATENTS

| | | | |
|---|---|---|---|
| 2,524,627 | 10/1950 | Hohenstein | 526/233 |
| 3,328,374 | 6/1967 | Ronden et al. | 526/233 |
| 3,442,881 | 5/1969 | Jahn et al. | 526/233 |
| 3,449,311 | 6/1969 | Lowell | 526/233 |
| 3,488,745 | 1/1970 | Wright | 526/233 |

Primary Examiner—Harry Wong, Jr.
Attorney, Agent, or Firm—Lewis J. Young

[57] ABSTRACT

The production of polymer beads by a suspension polymerization in which a vinyl aromatic monomer having a free-radical generating catalyst dissolved therein is suspended in an aqueous medium with the aid of from 0.2 to 1.0 percent by weight, based on monomer, of a finely divided phosphate suspending agent and heated to cause the monomer to polymerize into polymer beads is improved by treated the aqueous medium containing the phosphate and any extender with ultrasound prior to adding the monomer and polymerizing. The resulting polymer bead size is thereby found to be smaller than would have been obtained without the use of ultrasound.

4 Claims, No Drawings

SUSPENSION POLYMERIZATION PROCESS

BACKGROUND OF THE INVENTION

This invention relates to the suspension polymerization of vinyl aromatic monomers to form polymer particles in bead form.

Grim, in U.S. Pat. No. 2,673,194, describes the suspension polymerization of vinyl aromatic monomers, whereby an oil monomer is suspended as droplets in an aqueous medium and polymer beads or particles are produced by the use of an oil-soluble polymerization catalyst, such as benzoyl peroxide. The suspending system of the patent is comprised of finely divided, difficultly water-soluble phosphates, and an anionic surface-active agent which serves as an extender. As used in this art, compounds which act to increase the ability of the finely divided phosphate dispersant to stabilize suspensions are termed extenders. The extenders increase the ability of the phosphate dispersant to maintain stable suspensions with a greater proportion monomer and/or polymer in the suspension polymerization medium. Among the extenders listed by Grim are: sodium dodecylbenzene sulfonate, sodium tetradecyl sulfate, potassium stearate, and long chain alkyl sulfonates.

The suspension systems such as that of Grim produce polymer beads having a broad particle size distribution. The individual beads produced in suspension may range in diameter from less than 300 microns to above 2,000 microns with the average bead diameter being dependent upon the amount of suspending agent and extender present in the system. The average bead diameter can be controlled to some extent by varying the parameters of the system such as the ratio of suspending agent to extender or the ratio of suspending agent and extender to monomer. Although the average diameter size is changed through such variations, nevertheless, beads will be produced whose particle size range is broad.

For commerical reasons, it is highly desirable in this art to control the average particle size range within relatively narrow limits. This is especially true where the polymer beads are to be impregnated with a volatile expanding agent to produce polymer beads which will, upon heating, expand, e.g., in a mold, to fill the mold cavity and produce fused, expanded polymer articles.

One of the major uses of expandable polymer beads, particularly polystyrene beads, which are produced commerically by suspension polymerization, is in insulation applications such as insulation board. In manufacturing insulation board, it is common to mold a large (e.g. 4 ft. × 8 ft. × 20 ft.) billet of expanded polystyrene and subsequently cut the billet into slabs one or two inches thick for ultimate use as an insulation board. In preparing the large billets from expandable polymer beads, the beads are first pre-expanded to form non-fused, partially expanded beads having a bulk density of from 0.8–1.2 pounds per cubic foot. The partially expanded beads are then charged to the billet mold, and heat, usually in the form of steam, is applied to fully expand the beads whereby they fill the mold, fuse, and form the billet.

In the billet-molding application, it is especially critical that the expandable polymer beads be relatively large and substantially spherical.

If the beads are too small, then the expandable beads at the outer surface of the billet mold will fuse too soon, thereby excluding steam from the center of the mold. The resulting billet, therefore, has a center of unfused, expanded beads which is, of course, highly undesirable since any unfused portion of the billet is useless.

Hohenstein et al, in U.S. Pat. No. 2,652,392, reduced the amount of small particle-size beads formed by adding a water-soluble persulfate as extender for the calcium phosphate stabilizer.

Wright, in U.S. Pat. No. 3,631,014 shows that narrow distribution of bead sizes larger than 300 microns in diameter can be produced by the addition of at least 0.0003 percent by weight based on monomer of sodium bisulfite as sole extender for the phosphate.

Wright, in U.S. Pat. No. 3,649,610 shows that narrow distribution of bead sizes larger than 750 microns in diameter can be produced by the addition of at least 0.01 percent by weight based on monomer of certain terminal vicinal hydroxy-keto compounds as extender for the phosphate.

Wright, in U.S. Pat. No. 3,755,282, shows that narrow distribution of bead sizes larger than 1200 microns in diameter can be produced by the addition of 0.0001 percent by weight of alpha, beta-unsaturated carboxylic acids as sole extender for the phosphate.

Thus, all these methods show ways of affecting the average bead particle size in suspension polymerizations by varying the extender for the phosphate. The phosphate itself can lead to variations in the bead particle size. The efficiency of the phosphate has been found to vary with the age of the lot of phosphate and with the individual lot used.

SUMMARY OF THE INVENTION

We have now found a method for increasing the efficiency of difficultly water-soluble phosphate, as measured by the reduction of the average bead particle size obtained with any given lot of phosphate, by submitting the phosphate in aqueous suspension to ultrasonic waves immediately prior to the addition of the monomer.

DETAILED DESCRIPTION OF THE INVENTION

This invention is applicable in the suspension polymerization of vinyl aromatic monomers such as styrene, alpha-methyl styrene, mono- and dichloro styrene, as well as the copolymerization of at least 50% by weight of vinyl aromatic monomers with such monomers as divinylbenzene, acrylonitrile, alkyl acrylates, diallyl esters of dibasic aliphatic or aromatic acids, butadiene, and other polymers capable of further polymerization such as styrene-butadiene rubber, styrene isoprene rubber, and polybutadiene rubber.

The finely divided, difficultly water-soluble phosphates useful as dispersing agents in the practice of this invention are conventional and are those described, for example, in Grim U.S. Pat. No. 2,673,194. They include those finely divided phosphates difficultly soluble in water containing for each phosphate group at least three equivalents of a metal, the carbonate of which is only slightly soluble in water, e.g., tricalcium phosphate, hydroxy-apatite, magnesium phosphate, etc. Advantageously the amount of phosphate to be employed in this invention ranges from about 0.20 to 1.0 percent by weight based on monomer. The average particle size of polymer beads produced in the suspension polymerization depends primarily upon the total amount of phosphate suspending agent; for example, suspension with larger amounts of phosphate suspending agent yields beads of a smaller average particle size.

Sound waves are generally audible to the human ear if the frequency of vibration is in a range defined as 20 to 20,000 Hertz (cycles per second). The frequency range below 20 Hz. is the infrasonic, and that above 20,000 Hz. is the ultrasonic. Ultrasonic frequencies range from 20,000 Hz. to several thousand megahertz. For purposes of this invention, frequencies of from 40,000 to 60,000 Hz. are preferably used. Higher frequencies may tend to cause rupture of chemical bonds with accompanying destruction of the tricalcium phosphate. Conveniently, ultrasonic equipment sold commercially for ultrasonic cleaning, such as those sold by Branson Instruments Company of Stamford, Connecticut, may be used. These ultrasonic cleaners consist of a electronic generator to convert line current to high frequency electrical energy, a lead zirconate titanate transducer to convert electrical energy to ultrasonic energy (50,000–55,000 Hz.), and a tank to contain the liquid into which the ultrasonic energy is transmitted by the transducers.

In the process of this invention, water, phosphate suspending agent, and extender for the phosphate are charged to a reactor initially. The mixture is then treated with ultrasonic waves of from 40,000 to 60,000 cycles per second for at least 10 minutes. The monomer with its oil-soluble initiator is then added to the reactor and the whole heated to polymerization temperature. After polymerizing in suspension for the required time to give complete conversion of monomer to polymer, the suspension is cooled, acidified, the beads separated from the aqueous medium, washed with water and dried.

The ultrasonic treatment of the difficultly water soluble phosphate has increased the efficiency of the phosphate as a dispersing agent as indicated by the reduction of the average polymer bead particle size obtained with any given lot of the phosphate. The invention thus provides one more tool for the control of average polymer bead particle size.

The process of the invention may be used with monomer to water ratios which vary from about 0.3 to 1.5 parts by weight monomer per 1.0 part by weight water. The invention is especially valuable in that generally high monomer to water ratios are used, and a higher proportion of monomer in the suspension system is, of course, preferred from an economic standpoint.

The time and temperature cycles for the polymerization may be those conventionally employed. Conveniently, the cycle described in the Grim patent above, or the two-stage temperature cycle described in D'Alelio U.S. Pat. No. 2,692,260 is employed.

The free-radical initiating catalysts which are added to the suspension system are the conventional oil-soluble (monomer-soluble) oxidation catalysts such as organic peroxides, e.g., benzoyl peroxide and t-butyl perbenzoate. Other free-radical producing catalysts that may be used in the invention include azobisisobutyronitrile. Conveniently, conventional amounts of such catalysts are used in the invention.

This invention is further illustrated by, but is not intended to be limited to, the following examples wherein parts are parts by weight unless otherwise indicated.

EXAMPLE I

To each of two 12 ounce, crown-capped bottles was added 110 parts of water, 0.4 part of the dispersing agent tricalcium phosphate, and 0.0032 part of sodium bisulfite extender. One of the bottles was placed in an ultrasonic water bath and treated for 10 minutes with 80 watt, 50–55,000 cycles per second ultrasound. The sound was turned off and 100 parts of styrene monomer containing 0.30 part of the catalyst comprising 0.25 part of benzoyl peroxide and 0.05 part of t-butyl perbenzoate was added to each of the bottles. The bottles were capped and the suspensions were tumbled end-over-end in a heated oil bath at 90° C. for 7 hours. The suspensions were then cooled, the bottles opened and the suspensions were acidified with hydrochloric acid to a pH of about 1.0 to dissolve the phosphate. The beads were separated by centrifuge, washed with water, and air dried. The beads were screened into portions. The screen analysis, U.S. Standard Sieve, in percent by weight of polymer beads retained on each size screen was as follows:

| Screen No. | Weight-% Beads Retained | |
|---|---|---|
| | No Ultrasound | With Ultrasound |
| 8 | 6.2 | 0 |
| 10 | 27.0 | 0.1 |
| 16 | 63.5 | 20.1 |
| 20 | 2.4 | 50.6 |
| 25 | 0.1 | 14.0 |
| 30 | 0 | 7.5 |
| 40 | 0 | 5.4 |
| pan | 0 | 0.8 |

It should be noted that the weight percent polymer recorded in the screen analysis does not add up to 100 percent. The reason for this is that the weights are based on 100 parts monomer. Thus the total percentage represents the percent yield of polymer based on monomer and does not represent a percentage of the total polymer beads formed. All screen analyses in these examples are reported in the same manner.

It can be seen that the size of the majority of the beads has been reduced by the ultrasonic treatment as indicated by the shifting of the peak analysis from 16 mesh to 20 mesh, U.S. Standard Sieve.

EXAMPLE II

The process of Example I was repeated several times using different lots of commercial grade tricalcium phosphate. The results of the screen analyses are shown in the Table I. In all cases, the average particle size is lower for the samples treated with ultrasound. The particle size distribution is broadened at the same time, but this could be corrected by use of more of the extender, in this case sodium bisulfite.

TABLE I

| SONIFICATION OF TCP[a] | | | | | | | | | |
|---|---|---|---|---|---|---|---|---|---|
| TCP LOT | Sound[b] Energy | SCREEN ANALYSIS; WT. % ON U.S. | | | | | | | |
| | | 8 | 10 | 16 | 20 | 25 | 30 | 40 | PAN |
| A | No | 5.0 | 28.2 | 65.9 | 1.2 | 0 | 0 | 0 | 0 |

TABLE I-continued

SONIFICATION OF TCP[a]

| TCP LOT | Sound[b] Energy | SCREEN ANALYSIS; WT. % ON U.S. | | | | | | | |
|---|---|---|---|---|---|---|---|---|---|
| | | 8 | 10 | 16 | 20 | 25 | 30 | 40 | PAN |
| A | Yes | 0.1 | 1.3 | 77.4 | 18.1 | 1.6 | 0.4 | 0.1 | 0 |
| B | No | 0 | 0.1 | 18.1 | 52.4 | 16.0 | 6.9 | 3.7 | 0.2 |
| B | Yes | 0.1 | 0.1 | 4.2 | 42.7 | 23.3 | 14.1 | 11.0 | 2.3 |
| C | No | 0.1 | 0.2 | 39.4 | 41.3 | 9.2 | 4.8 | 2.9 | 0.3 |
| C | Yes | 0.2 | 0.2 | 12.0 | 42.2 | 21.2 | 11.8 | 9.2 | 1.3 |
| D | No | 1.8 | 16.1 | 76.4 | 4.0 | 0.2 | 0.1 | 0 | 0 |
| D | Yes | 0.1 | 0.2 | 17.4 | 48.7 | 16.9 | 8.3 | 5.6 | 0.6 |
| E | No | 0.9 | 6.7 | 82.4 | 8.6 | 0.4 | 0.1 | 0 | 0 |
| E | Yes | 0.1 | 0.5 | 18.0 | 42.3 | 16.0 | 10.4 | 8.8 | 1.8 |
| F | No | 57.3 | 22.5 | 18.0 | 0.6 | 0 | 0 | 0 | 0 |
| F | Yes | 0.5 | 3.7 | 69.2 | 16.8 | 3.7 | 2.1 | 2.1 | 0.3 |
| G | No | 77.2 | 11.2 | 10.7 | 0.4 | 0 | 0 | 0 | 0 |
| G | Yes | 0.3 | 1.0 | 60.1 | 27.8 | 5.4 | 2.8 | 2.0 | 0.2 |
| H | No | 49.8 | 27.9 | 22.8 | 0.4 | 0 | 0 | 0 | 0 |
| H | Yes | 0.1 | 0.3 | 42.5 | 40.2 | 9.5 | 4.4 | 2.9 | 0.5 |

[a]TCP is tricalcium phosphate
[b]Ultrasonic Water Bath Coulter Electronic, 80 Watt, 50–55,000 cycles/sec for 10 minutes.

Although these examples have shown only the use of sodium bisulfite as extender, the extender could be any of the known extenders, such as for example, sodium dodecylbenzene sulfonate, the hydroxy-ketones, or the unsaturated carboxylic acids. The action of the ultrasonic waves is believed to affect only the phosphate particles. Therefore, the extender used is immaterial to the invention.

We claim:

1. In a process for producing polymer beads by adding vinyl aromatic monomer containing from 0.15 to 0.55 percent by weight based on monomer of a monomer-soluble free-radical producing catalyst to an aqueous dispersion of from 0.20 to 1.0 percent by weight based on monomer of a finely divided, difficultly water-soluble phosphate with or without an extender for said phosphate and subjecting the resulting suspension to an elevated temperature to cause said monomer to polymerize, the improvement consisting of treating the aqueous dispersion of phosphate, prior to the addition of monomer, with 40,000 to 60,000 cycles per second ultrasonic waves for at least 10 minutes, whereby the polymer bead size resulting from the polymerization is less than the bead size produced by the same lot of phosphate in the absence of ultrasound.

2. The process of claim 1 wherein the vinyl aromatic monomer is styrene.

3. The process of claim 1 wherein the finely divided, difficultly water-soluble phosphate is tricalcium phosphate.

4. The process of claim 1 wherein the ultrasonic treatment is with 55,000 cycles per second ultrasonic waves for 10 minutes.

* * * * *